(12) United States Patent
Surla et al.

(10) Patent No.: US 11,055,010 B2
(45) Date of Patent: Jul. 6, 2021

(54) DATA PARTITION MIGRATION VIA METADATA TRANSFER AND ACCESS ATTRIBUTE CHANGE

(71) Applicant: Microsoft Technology Licensing, LLC, Redmond, WA (US)

(72) Inventors: Rushi Srinivas Surla, Kenmore, WA (US); Maneesh Sah, Sammamish, WA (US); Shane Kumar Mainali, Duvall, WA (US); Wei Lin, Issaquah, WA (US); Girish Saini, Sammamish, WA (US); Arild Einar Skjolsvold, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 16/561,985

(22) Filed: Sep. 5, 2019

(65) Prior Publication Data
US 2021/0072917 A1    Mar. 11, 2021

(51) Int. Cl.
   G06F 3/06     (2006.01)
   G06F 11/30    (2006.01)
(52) U.S. Cl.
   CPC .......... *G06F 3/0647* (2013.01); *G06F 3/064* (2013.01); *G06F 3/067* (2013.01); *G06F 3/0614* (2013.01);
   (Continued)
(58) Field of Classification Search
   CPC .. G06F 3/0647; G06F 11/3034; G06F 3/0614; G06F 3/067; G06F 3/064; G06F 3/0653; G06F 3/0644; G06F 3/0683
   (Continued)

(56) References Cited

U.S. PATENT DOCUMENTS 9,083,724 B2   7/2015   Kamawat et al.
9,298,752 B2   3/2016   Do
(Continued)

OTHER PUBLICATIONS

"VSphere vMotion", Retrieved from: https://web.archive.org/web/20170319040649/https:/www.vmware.com/in/products/vsphere/vmotion.html, May 19, 2017, 3 Pages.
(Continued)

*Primary Examiner* — Hong C Kim
(74) *Attorney, Agent, or Firm* — Alleman Hall Creasman & Tuttle LLP

(57) ABSTRACT

One example provides a method of migrating a data partition from a first storage cluster to a second storage cluster, the method including determining that the data partition meets a migration criteria for migrating from the first storage cluster to the second storage cluster, on the first storage cluster, preparing partition metadata to be transferred, the partition metadata describing one or more streams within the data partition and one or more extents within each stream, transferring the partition metadata from the first storage cluster to the second storage cluster, directing new transactions associated with the data partition to the second storage cluster, including while the one or more extents reside at the first storage cluster, on the first storage cluster, changing an access attribute of the one or more extents within the data partition to read-only, and on the second storage cluster, performing new ingress for the data partition.

20 Claims, 8 Drawing Sheets

(52) U.S. Cl.
CPC .......... G06F 3/0644 (2013.01); G06F 3/0653 (2013.01); G06F 3/0683 (2013.01); G06F 11/3034 (2013.01)

(58) Field of Classification Search
USPC ........ 709/224, 223; 707/629, 781, 829, 831; 711/154, 165
See application file for complete search history.

(56) References Cited

U.S. PATENT DOCUMENTS

| | | | |
|---|---|---|---|
| 9,348,655 | B1 | 5/2016 | Tsirkin et al. |
| 10,331,801 | B2 | 6/2019 | Marsden |
| 10,372,370 | B2* | 8/2019 | De Schrijver ........ G06F 3/0611 |
| 10,657,154 | B1* | 5/2020 | Dugar ........................ G06F 9/52 |
| 10,839,093 | B2* | 11/2020 | Gupta .................. G06F 3/0664 |
| 2013/0151683 | A1 | 6/2013 | Jain et al. |
| 2015/0254240 | A1 | 9/2015 | Li et al. |
| 2015/0381453 | A1* | 12/2015 | Skjolsvold .......... H04L 43/0876 709/224 |
| 2016/0004571 | A1* | 1/2016 | Smith .................. G06F 16/278 718/105 |
| 2019/0364105 | A1* | 11/2019 | Lou ...................... G06F 3/0635 |
| 2019/0370360 | A1* | 12/2019 | Mainali ................. G06F 16/122 |
| 2019/0392053 | A1* | 12/2019 | Chalakov .............. G06F 16/137 |
| 2020/0379651 | A1* | 12/2020 | Lazier ................... G06F 3/0647 |

OTHER PUBLICATIONS

Elmore, et al., "Zephyr: Live Migration in Shared Nothing Databases for Elastic Cloud Platforms", In Proceedings of the ACM SIGMOD International Conference on Management of data, Jun. 12, 2011, 12 Pages.

Fleishman, Glenn, "How to selectively migrate files from Time Machine", Retrieved from: https://www.macworld.com/article/3188047/how-to-selectively-migrate-files-from-time-machine.html, Apr. 12, 2017, 5 Pages.

Pyle, et al., "Storage Migration Service frequently asked questions (FAQ)", Retrieved from: https://docs.microsoft.com/en-us/windows-server/storage/storage-migration-service/faq, Apr. 6, 2019, 8 Pages.

Siron, Eric, "How to Perform Hyper-V Storage Migration", Retrieved from: https://www.altaro.com/hyper-v/hyper-v-storage-migration/, Oct. 11, 2017, 20 Pages.

"International Search Report and Written Opinion Issued in PCT Application No. PCT/US20/038007", dated Sep. 15, 2020, 12 Pages.

\* cited by examiner

DATA PARTITION MIGRATION VIA METADATA TRANSFER AND ACCESS ATTRIBUTE CHANGE

BACKGROUND

Customers of a distributed storage system may use a storage account to store their data in the distributed storage system. A particular geographical region of the distributed storage system may include one or more data center buildings, and each data center building may include multiple storage clusters. A storage cluster is a collection of servers (nodes) running a common distributed software, e.g. a collection of software services. Each storage cluster serves plural (e.g., several hundred to several thousand) storage accounts and associated transactions, which utilize central processing unit (CPU) resources on each of the nodes.

A distributed storage system may migrate a storage account from one storage cluster to another storage cluster for various reasons, such as to alleviate capacity pressure in the storage cluster, to balance CPU and input/output operations per second (IOPS) among storage clusters within a region, and/or to decommission a storage cluster. Further, if a live site is running on the storage cluster, the distributed storage system may migrate some impacted storage accounts to another storage cluster.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to data migration in a distributed computing system. One example provides, enacted on a computing system, a method of migrating a data partition from a first storage cluster to a second storage cluster. Each storage cluster may be implemented via one or more server computers. The method comprises determining that the data partition meets a migration criteria for migrating from the first storage cluster to the second storage cluster; on the first storage cluster, preparing partition metadata to be transferred, the partition metadata describing one or more streams within the data partition and one or more extents within each stream; transferring the partition metadata from the first storage cluster to the second storage cluster; directing new transactions associated with the data partition to the second storage cluster, including while the one or more extents reside at the first storage cluster; on the first storage cluster, changing an access attribute of the one or more extents within the data partition to read-only; and on the second storage cluster, performing new ingress for the data partition.

DETAILED DESCRIPTION

Figure 1:
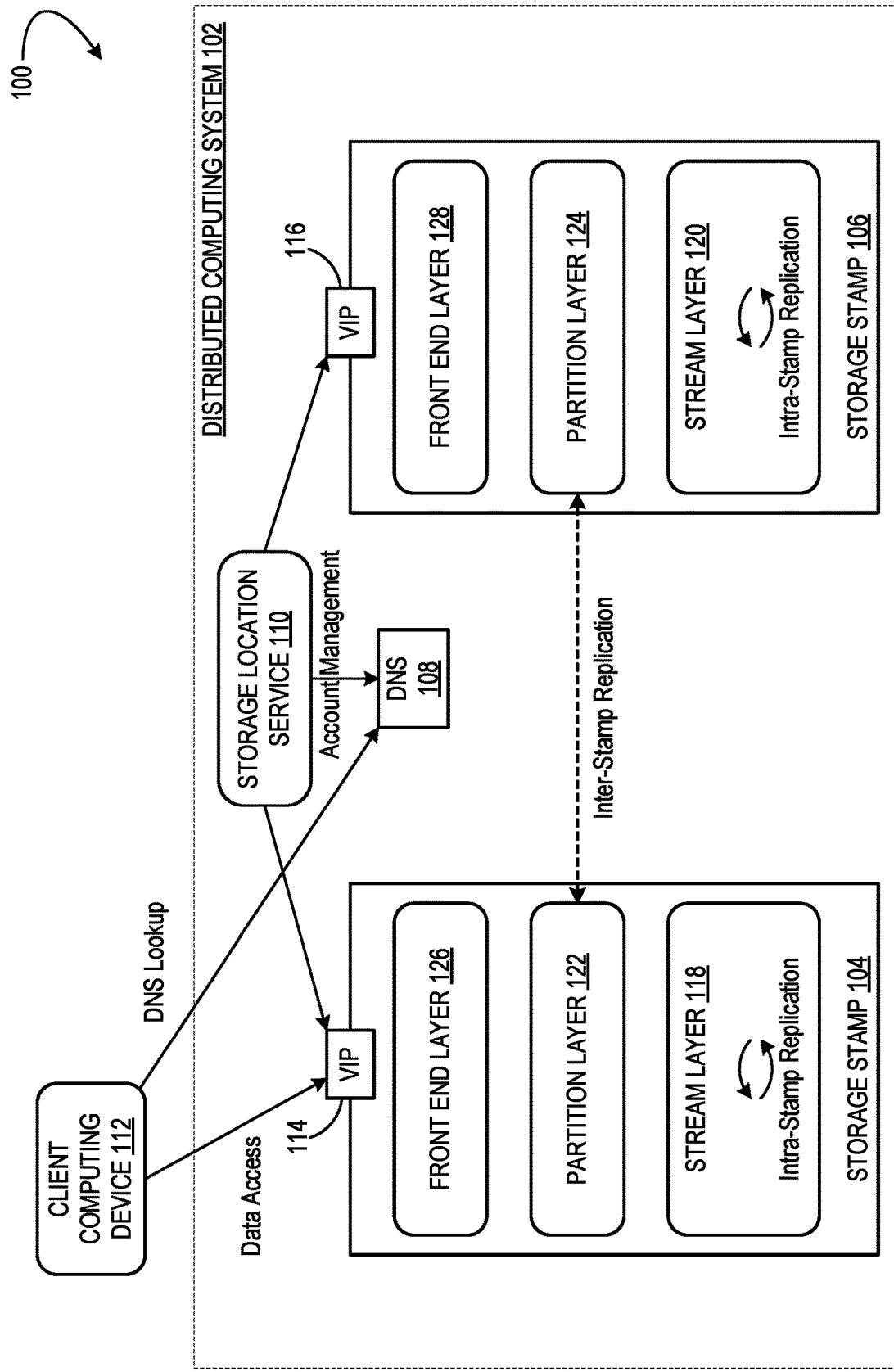
FIG. 1 schematically shows an example computing environment for implementing a distributed storage system.

FIG. 1 shows an example computing environment 100 that includes a distributed storage system 102. Data is stored in storage stamps 104 and 106, where each storage stamp (also referred to herein as a "storage cluster") is a cluster of N racks of storage nodes, and where each rack is built out as a separate fault domain with redundant networking and power.

The distributed storage system 102 implements a global storage namespace that allows data to be stored in a consistent manner. In some examples, the storage namespace utilizes the Domain Name System (DNS) 108 and may include two parts: an account name (customer selected name and part of the DNS host name), and an object name (identifies individual objects within the account). Accordingly, all data is accessible via a Uniform Resource Identifier (URI) that includes the account name and the object name if individual objects are being accessed.

A storage location service 110 is configured to manage all storage stamps, and is responsible for managing the account namespace across all storage stamps. To increase storage, more storage stamps may be deployed in a data center and added to the storage location service 110, and the storage location service 110 may allocate new accounts to the new storage stamps while also load balancing existing storage accounts from old stamps to new stamps. The storage location service 110 tracks resources used by each storage stamp across all locations, and when an application requests a new account for storing data, the storage location service 110 specifies the location affinity for the storage, and chooses a storage stamp within that location as the primary stamp for the account based on load information across all stamps. The storage location service 110 then stores the account metadata information in the chosen storage stamp, instructing the stamp to start receiving traffic for the account. The storage location service 110 also updates DNS 108 to allow requests to route from a client computing device 112 to that storage stamp's virtual IP (VIP), as shown at 114 and 116 respectively for storage stamps 104 and 106.

Each storage stamp has three layers, which from the bottom up are: (1) a stream layer, at 118 and 120, that stores bits on disk and is configured to distribute and replicate data across servers within a storage stamp; (2) a partition layer, at 122 and 124, configured to manage higher level data abstractions (e.g. blobs, tables, queues), provide a scalable object namespace, store object data on top of the stream layer, provide transaction ordering and consistency for objects, send transactions to other storage stamps, and cache object data to reduce disk I/O; and (3) a front-end layer, at 126 and 128, that receives incoming requests, authenticates and authorizes the requests, and routes the requests to a partition server in the partition layer.

Intra-stamp replication may be used within the stream layer, which is synchronous replication that keeps enough replicas of the data across different nodes in different fault domains to keep data durable within the storage stamp. Intra-stamp replication replicates blocks of disk storage that are used to make up objects. Further, inter-stamp replication may be used within the partition layer, which is asynchronous replication that replicates data across storage stamps. Inter-stamp replication replicates objects and transactions applied to those objects. Intra-stamp replication provides durability against hardware failures, whereas inter-stamp replication provides geo-redundancy against geo-disasters.

The front-end layer 126, 128 of a storage stamp 104, 106 includes stateless servers that receive incoming requests (e.g. from client computing device 112). Upon receiving a request, a front-end server looks up an account name associated with the request, authenticates and authorizes the request, and routes the request to a partition server in the partition layer 122, 124 (e.g. based on a partition name). The distributed computing system 102 maintains a partition map of partition name ranges and which partition server is serving which partition name. The front-end servers may cache the partition map and use the partition map to determine to which partition server to forward each request. The front-end servers also may stream large objects directly from the stream layer and cache frequently accessed data.

The stream layer 118, 120 acts as a distributed file system within a storage stamp 104, 106. The stream layer understands files called "streams", which are ordered lists of pointers to extents. Extents are logical blocks of data stored at some physical location on disk. When the extents are concatenated together, the extents represent the full contiguous address space in which the stream can be read in the order the extents were added to the stream. A new stream can be constructed by concatenating extents from existing streams. Extents are units of replication in the stream layer. Each of a plurality of data storage nodes in the stream layer maintains storage for a set of extent replicas (e.g. three replicas within a storage stamp for each extent).

While data is stored in the stream layer, it is accessible from the partition layer 122, 124. The partition layer 122, 124 maintains a highly scalable table that includes object-related metadata (object name, storage account that stores the object, etc.) and forms a primary key. The table—also referred to herein as a partition index—includes pointers to corresponding data blocks on the disks. In this manner, the partition layer keeps track of the streams, extents, and byte offsets in the extents in which objects are stored. While the partition layer may only know the logical position of each extent, the stream layer maintains a mapping of where each extent is physically stored. The table includes millions of objects that cannot be served by a single server, so the table is broken into units called "partitions". The partition layer partitions all data objects within a storage stamp 104, 106 and provides data structures (e.g. blobs, queues, tables) for supporting different cloud services. Partition servers (daemon processes in the partition layer) and stream servers may be co-located on each storage node in a storage stamp.

A partition is a collection of multiple streams and each stream is a container of multiple extents. Each stream within a partition may serve a different purpose. For example, the table may be stored as extents in one of the streams (e.g. an index stream), whereas data extents may be stored in a different stream (e.g. a data stream), and other streams (e.g. a metadata stream) may store other extents. Each partition layer serves a set of objects in a key range ranging from a KeyLow to a KeyHigh, where each object comprises a partition name. Objects are broken down into disjointed ranges based on the partition name values and served by different partition servers of the partition layer. Thus, the partition layer manages which partition server is serving which partition name ranges for blobs, tables, and queues. Each partition constitutes the table itself, the key range where the objects are stored, and the data blocks themselves (stored in streams). A table server (TS) serves the partition. Further, the partition layer provides automatic load balancing of partition names across the partition servers based upon traffic.

As mentioned above, users (e.g. businesses, individuals, or other entities) of the distributed storage system 102 may use a storage account to store data in the distributed storage system 102. A storage account functions as a container where the customer stores a collection of objects associated with the storage account. A customer may utilize any number of storage accounts, and each storage account may include limits on TPS, bandwidth for receiving/sending data, etc.

At times, one or more storage accounts on a storage cluster may be performing heavy workload. In such instances, the distributed computing system 102 may perform load balancing by migrating one or more select storage accounts to a different storage cluster. The distributed computing system may migrate a storage account from a source storage cluster to a destination storage cluster for various reasons, including but not limited to balancing CPU resources, IOPS, and/or transactions per second (TPS) among storage clusters, alleviating capacity pressure in a source storage cluster, decommissioning a storage cluster, and/or reducing impact of live sites running on a storage cluster.

Currently, account migration may involve deep copying of all objects (blobs, disks, tables, queues, etc.) and the underlying data in the storage account from the source storage cluster to another storage cluster within the same geographical region. This deep copying involves iterating through each object in a partition (which may utilize parallelism), reading the objects and the underlying data, dispatching the data to the destination storage cluster, and verifying the objects and underlying data between the source and destination storage clusters (e.g., to ensure that the copy is correct, there are no software bugs in the copy process, etc.). The data verification may involve computing a hash on both the source storage cluster and the destination storage cluster and verifying that the computed hashes match. Once the objects and data are verified, customer traffic is reopened at the destination storage cluster instead of at the source storage cluster.

A storage account may include millions of objects, including objects of different types (e.g., blobs, disks, tables, queues, etc.). Moving all the objects within a storage account, and moving at scale, poses various challenges. For example, iterating through each object in a partition is a CPU-intensive process. Further, the above-described account migration process requires a disk I/O per object to be migrated, regardless of object size. The millions of I/O required to migrate millions of objects utilizes a considerable amount of CPU resources and bandwidth. When a select storage cluster is running hot on CPU and/or bandwidth usage, the distributed computing system 102 may be unable to schedule enough object migrations to stabilize the storage cluster. The distributed computing system 102 also may be unable to complete some critical migrations, such as those related to a live site on a storage cluster, fast enough to prevent impact to other storage accounts on the storage cluster. Further, such load balancing operations interrupt service to a storage account being migrated.

In addition to the above problems, current account migration approaches may not be feasible for certain storage accounts. As one example, current account migration processes may be too timely and computing resource-intensive for a storage account with a large object count (large number of blobs, table entity count, queue message count, etc.), due to the disk I/O required to move each object. As another example, current account migration processes involve copying and migrating data in layers on the order of 1 kilobyte (KB) in size. Thus, migrating a storage account with a large size (e.g., several petabytes (PB)) may take an unreasonably long time, such as months, to migrate. Further, for storage accounts with high TPS, the rate of data transfer during such a migration process may not be sufficient to keep up with ongoing transactions. Similarly, for high ingress accounts, if a rate of transfer of objects during account migration is slower than an incoming rate from account users, then the account migration may not reach completion. For example, once a deep copy of existing data is complete, the distributed storage system operates in a "catch-up" mode to transfer recently received data on the source storage cluster to the destination storage cluster, which may not be possible if ingress is too high. As yet another example, a storage account may exceed a threshold number of blob snapshots (a point-in-time copy of an object) or snapshot creation frequency may outpace an account migration process, and a subsequent migration verification process may lag behind user storage account ingress. Further, for any of the above reasons, the aforementioned account migration processes may not be feasible for premium service-level accounts to which service cannot be interrupted.

Accordingly, examples are disclosed herein that relate to migration operations in partition metadata transfer is decoupled from the data blocks (extents) themselves. Rather than performing a deep copy of the data within a storage account and moving the data between storage clusters, the disclosed migration operations involve handing off a partition (all objects within a key range) or a group of partitions concurrently from a source storage cluster to a destination storage cluster. Because the disclosed partition handoff involves transferring ownership of extents (partition index and data) from the source storage cluster to the destination storage cluster while the extents themselves may still reside at the source storage cluster, the handoff may be faster than current data copy migration operations. By transferring extent ownership, subsequent incoming write requests land on the destination storage cluster, which provides relief to resources of the source storage cluster that were previously occupied with incoming traffic. This also avoids scenarios in which ingress is too high to facilitate account migration, since ingress points at the destination storage cluster. Further, the migration operations described herein may occur as background processes without interrupting storage account service, thereby appearing transparent to a user(s) of the storage account.

Briefly, a partition handoff from a source storage cluster to a destination storage cluster includes a preparation phase and a handoff phase. During the preparation phase, the source storage cluster transfers extent metadata to the destination storage cluster. As this extent metadata transfer is decoupled from ingress, high ingress does not impact the metadata size. The preparation phase, which does not impact user traffic to a storage account, helps to quicken the handoff phase, during which user traffic may be regulated.

In some examples, the partition handoff process is orchestrated by a table master (TM) of the source storage cluster. A TM manages multiple table servers (TSs), determines which table server hosts which partition, and updates the partitions table. In other examples, an external driver in communication with both the TM of the source storage cluster (TM-Source) and the TM of the destination storage cluster (TM-Dest) may orchestrate the partition handoff process. While the examples described hereinafter involve communication between the TM-Source and the TM-Dest, in other examples an external agent may drive the partition handoff process.

Prior to the partition handoff, the distributed computing system 102 pairs a source storage cluster and a destination storage cluster for an account being migrated. Pairing the two storage clusters may comprise, for example, programming firewall rules to allow traffic between the two storage clusters, and enabling name resolvers on each storage cluster to know about the role information of each cluster. Further, pairing the two storage clusters may involve enabling shared front end (FE) resources, such that every FE in each storage cluster participating in the pairing downloads and maintains a partition map of each storage cluster participating in the pairing. By enabling shared FE, an FE is able to re-direct user requests to the correct partition serving a key range for any account belonging to the paired storage clusters. It will be understood that virtualizing the storage account being migrated prior to partition handoff, such that the DNS of the storage account points to the VIPs of both storage clusters, may optionally be performed.

Figure 2:
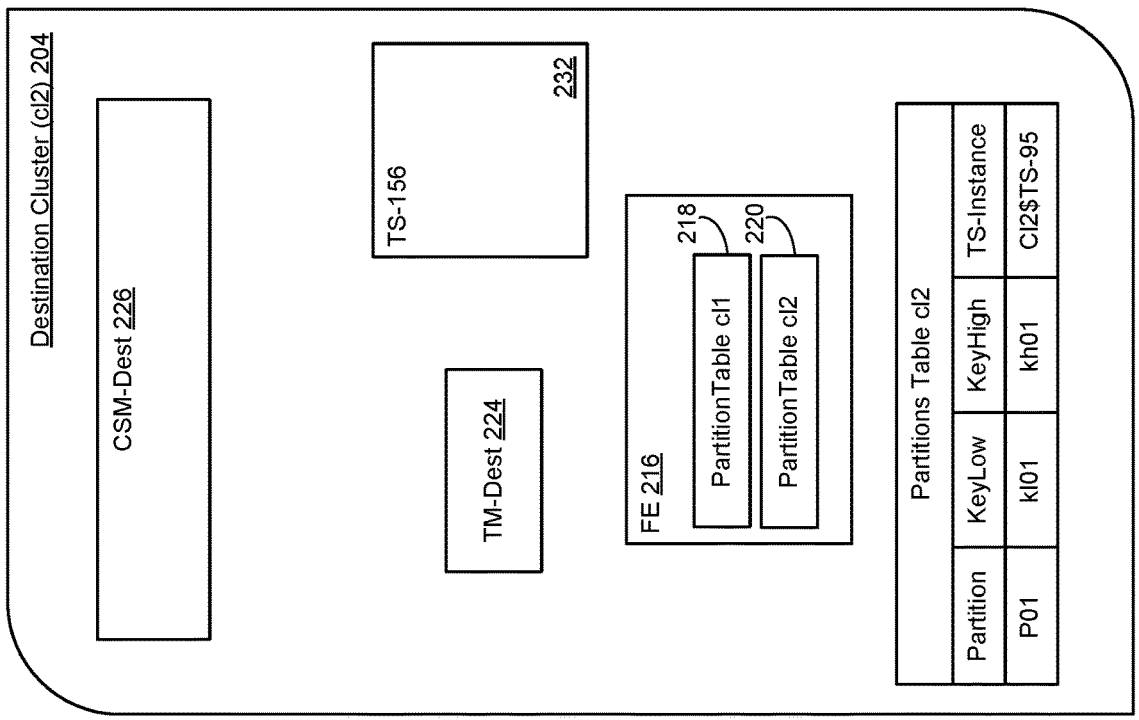
FIG. 2 schematically shows a state of a source storage cluster and a destination storage cluster prior to a partition handoff.
Figure 2:
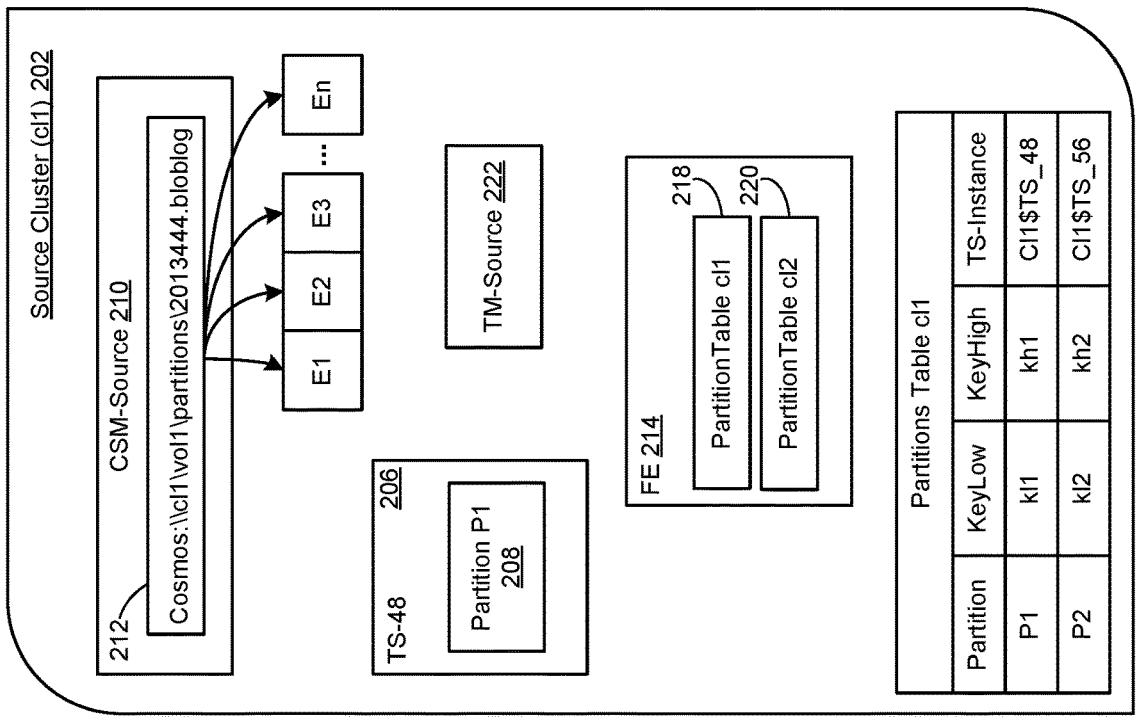

FIG. 2 illustrates an example source storage cluster (cl1) 202 and destination storage cluster (cl2) 204 prior to a partition handoff. In this example, a table server (TS-48) 206 serves a first partition (P1) 208 belonging to an account being migrated from the source storage cluster 202 to the destination storage cluster 204. A cluster service manager of the source storage cluster (CSM-Source) 210 owns and manages the streams (one of which is shown at 212) and underlying extents (indicated as extents E1 to En) of the first partition 208. More specifically, the CSM-Source 210 maintains logical to physical mapping for extent storage.

The FE 214, 216 roles are shared, such that the FE roles on both storage clusters 202, 204 maintain the partition tables 218, 220 for both clusters in-memory and refresh the partitions tables (e.g. periodically, or when an entry is invalidated). When the storage account being migrated is virtualized, user requests for the storage account may be directed to FE roles on both clusters 202, 204 and re-directed to the first partition 208 on TS-48 206 of the source storage cluster 202. When the storage account is not virtualized, user requests may be directed to FEs 214 of the source storage cluster 202.

In the preparation phase, the TM-Source 222 interacts with the TS of the source storage cluster (TS-Source) 206 and the TM-Dest 224, which each interact with their respective CSM (CSM-Source 210 and CSM-Dest 226) to prepare for the partition handoff. The TM-Source 222 informs the TM-Dest 224 to prepare the streams managed by the CSM-Dest 226, which will receive extents from the CSM-Source 210. As mentioned above, to keep the handoff phase lightweight, the preparation phase involves transferring the extent metadata from the source storage cluster 202 to the destination storage cluster 204.

Figure 3:
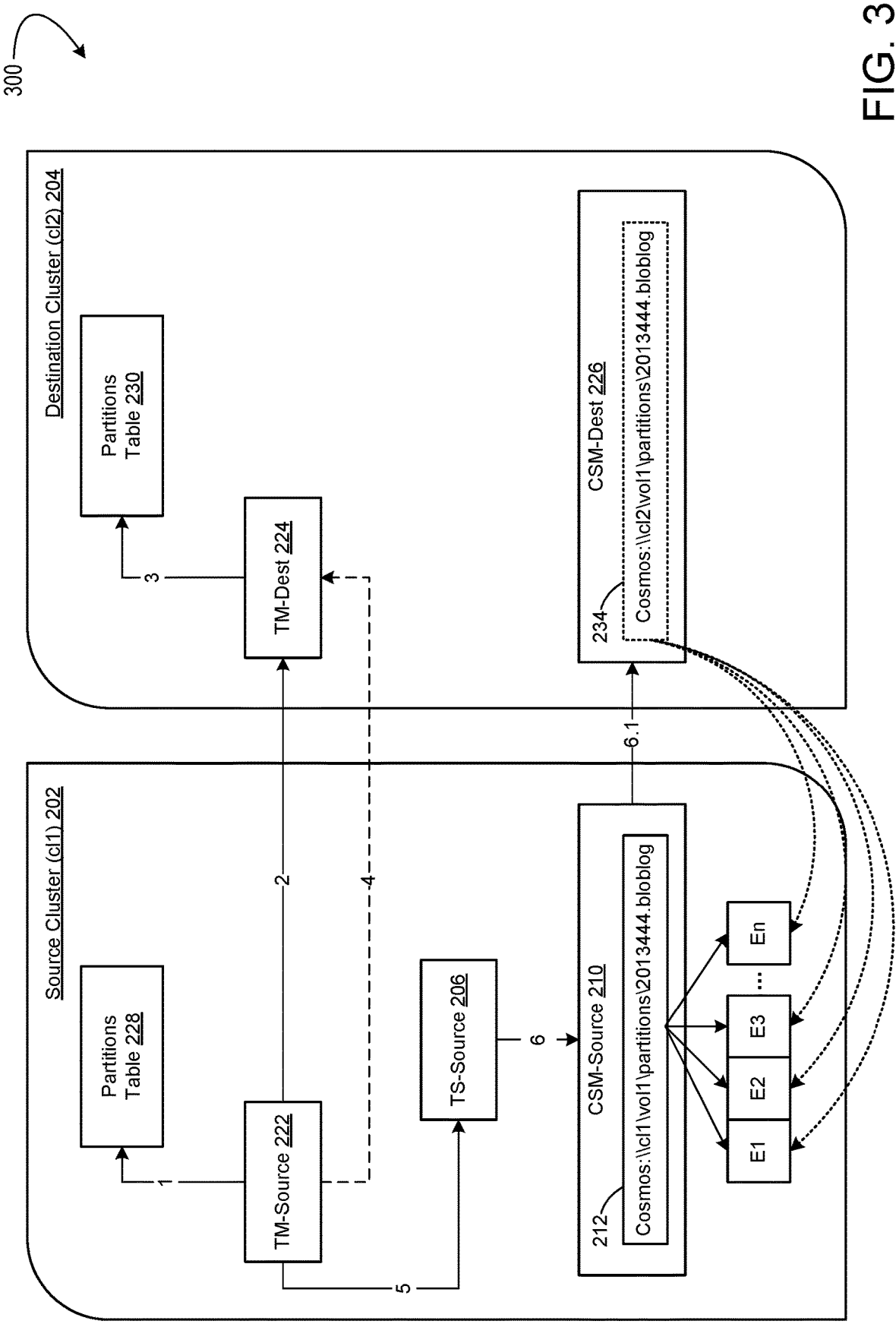
FIG. 3 schematically shows aspects of a preparation phase of a partition handoff.

FIG. 3 schematically depicts steps involved in the preparation phase 300 of a partition handoff. As indicated by arrow (1), the TM-Source 222 quarantines the key range of the partition, blocks splits and merges on the key range, and persists an intention to begin the handoff of the partition in the source partitions table 228. Though the TM-Source 222 blocks splits and merges on the key range, high-priority offloads are permitted. TM failover may cause the new TM to read this information and re-execute the preparation workflow. The information persisted in the source partitions table 228 may include a flag indicating the beginning of preparation for partition handoff on the source storage cluster. An existing partitions table for a current data migration system may undergo a schema upgrade or otherwise retrofit columns to accommodate such flags.

Next, as indicated by arrow (2), the TM-Source 222 performs an initial handshake with the TM-Dest 224, which informs the TM-Dest 224 of the intention to handoff. In some instances, the initial handshake is performed via an asynchronous application programming interface (API) request (e.g. a request to prepare for partition handoff on the TM-Dest). The initial handshake includes sending values defining a low end and a high end of a key range for the partition and a partition name. In various examples, the initial handshake may include sending a short name for the partition rather than the partition name, which may help ease debugging.

Next, as indicated by arrow (3), the TM-Dest 224 quarantines the key range. The TM-Dest 224 may block the new key range by splitting an existing partition on the destination storage cluster 204, such that the new key range becomes part of an existing partition's key range. The TM-Dest 224 also creates a partition entry in the partitions table 230 on the destination storage cluster 204. In the partition entry, the table server instance may not be populated, and information regarding a state of the partition being received may stored as a flag in a flags column of the partitions table. In one specific example, a flag indicating that a partition handoff is in progress on the destination storage cluster may represent the state of the partition and also instruct the TM-Dest 224 to not load the partition on any TS-Dest (232 in FIG. 2) upon failover, as this partition is not yet in a valid state to do so. In some examples, the TM-Dest 224 may batch updates to the destination partitions table 230 for the quarantined key ranges (left-hand side and right-hand side partitions of the partition being handed off, and the partition being handed off itself). If the TM-Dest 224 fails over, the TM-Source 222 may continue to retry. This step may be configured to be idempotent so that the TM-Dest 224 is able to verify/complete the unfinished work in the retry attempt. The TM-Dest 224 need not save a command in the transaction log, as the TM-Source 222 polls/retries the asynchronous API to prepare for partition handoff.

As indicated by arrow (4), the TM-Source 222 polls for the completion of the TM-Dest 224 asynchronous API call. When successful, the TM-Source 222 requests the TS-Source 206 to prepare for partition handoff on the TS-Source 206, for example, via an asynchronous API call.

When the TS-Source 206 receives the request, the TS-Source 206 performs various actions, as indicated by arrow (5). As the requested operation is an idempotent operation, the API is expected to complete the preparation step reliably even in instances where the TM-Source 222 fails over and/or the TS-Source 206 crashes or restarts. The TS-Source 206 checkpoints its memory-table and persists handoff state information in its metadata stream record including partition flags with handoff state information (e.g. indicating that preparation for partition handoff on the source storage cluster is in progress) and the source cluster name. If the partition reloads for any reason during this step (e.g. TS-Source crashes or restarts, emergency offload, forceful partition reassignment from a storage diagnostics service for a livesite, etc.), the TS-Source 206 may re-execute the steps involved in the preparation for TS-Source partition handoff during reload using the metadata stream record. For example, the TS-Source 206 may submit a job to a lazy worker (e.g. a thread pool). The TS-Source 206 also blocks multi-modifies, deletes, and stream operation on the partition streams, which may help simplify extent handoff between the CSM-Source 210 and CSM-Dest 226. At this stage, newer writes may still be permitted to the partition, extents may be sealed, and newer extents may be created. Further, linking extents at the end of the stream—although a multi-modify operation—may be allowed for copy blob cases.

The TS-Source 206 also informs the CSM-Source 210 to create mirror streams 234 on the destination storage cluster 204 and prepare for extent handoffs for each stream 212, as indicated by arrow (6). The TS-Source may inform the CSM-Source 210 via an API configured to associate the stream 212 (whose extents are being handed off) of the source storage cluster 202 with the stream on the destination storage cluster 204. In response, the CSM-Source 210 transfers a bulk of the extent metadata to the CSM-Dest 226 in order to make the handoff phase lightweight. The steps taken by the TS-Source to block major stream modification operations may help to prevent any significant changes to the extent metadata after the preparation phase.

In one example, the CSM-Source 210 and the CSM-Dest 226 perform the following actions at arrow (6.1) to complete the preparation phase. The CSM-Source 210 creates partition streams on the destination storage cluster 204, which are empty (e.g. do not yet have any extents) in preparation to receive extents from the source storage cluster 202. The CSM-Source 210 works with the CSM-Dest 226 to copy "sealed" extents metadata, with sealed extents being immutable. The CSM-Source 210 performs validations for feasibility of handing over the extents to the destination storage cluster 204, such as a confirmation check for connectivity with the CSM-Dest 226, a codec compatibility check, and/or a determination of any data unavailability on the destination storage cluster 204. At this stage, the extents are still managed by the CSM-Source 210 and if extent nodes fail and the extents have to be replicated/repaired, then the CSM-Source 210 is responsible for the replication/repair. Where the sealed extents metadata on the CSM-Dest 226 may be slightly stale, this may be resolved during the handoff phase (e.g. using extent metadata locally managed tablespaces, etc.), which is described in detail below. The CSM-Dest 226 may also verify the extents metadata post-transfer as part of this call by syncing with extent nodes (EN nodes) serving those extents. If an extent is held by one or more streams belonging to the same partitions, the extent ownership may be transferred to the CSM-Dest 226. If an extent is linked to multiple streams owned by different partitions, the extent ownership may not be immediately transferred to the CSM-Dest 226, and instead transferred once all the different partitions are handed off to the CSM-Dest 226.

The extent metadata transfer performed in the preparation phase 300 is decoupled from ingress. Regardless of how high ingress is, the extent metadata size may remain relatively unchanged. This allows the distributed storage system to perform little to no "catch-up" to transfer recently received data on the source storage cluster to the destination storage cluster. In one specific example, each extent of a stream is three gigabytes (GB) in size with 30 megabytes per second (MBps) ingress into the stream. In this example, the ingress may create one new extent every one hundred seconds, and the number of new extents created during the preparation phase 300 may be less than ten. In another specific example, for a stream comprising fifty thousand extents (with erasure code fragments), the metadata transfer is completed in two seconds or less. In this example, each extent metadata is less than five hundred bytes and batch transferred, so the catch-up needed with extent metadata transfer may be nearly negligible, even for high ingress accounts.

As mentioned above, one or more partition flags and/or a partition metadata stream record for the partition handoff may be updated during the preparation phase 300. For example, in the steps indicated by arrows (1) and (2) in FIG. 3, the TM-Source 222 may update a partition flag in the source partitions table 228 to indicate a state of beginning to prepare for partition handoff on the source storage cluster. As another example, in the steps indicated by arrows (3) and (4) in FIG. 3, the TM-Dest 224 may update a partition flag in the destination partitions table 230 to indicate that partition handoff is in progress on the destination storage cluster 204. At this point, the source partitions table 228 may still include the partition flag indicating the state of beginning to prepare for partition handoff on the source storage cluster. As yet another example, in the steps indicated by arrows (5), (6), and (6.1) in FIG. 3, the TM-Source 222 may update the partition metadata stream record for the partition handoff to indicate that preparing for partition handoff on the source storage cluster is in progress.

Once the preparation phase 300 is complete, the first partition 208 belonging to the account being migrated from the source storage cluster 202 to the destination storage cluster 204 is still served by TS-48 206 of the source storage cluster 202. A table server TS-156 (shown as 232 in FIG. 3) on the destination storage cluster 204 has created the partition streams for the first partition 208, to hold the extents being handed off in the handoff phase. The first partition's streams and the underlying extents are still owned and managed by the CSM-Source 210. However, the CSM-Dest 226 has established a secondary ownership of at least some of the sealed extents. The FE roles behavior may remain unchanged after the preparation phase 300, such that user requests for the storage account may be directed to FE roles on both clusters (e.g. via VIPs 114, 116) and be correctly re-directed to the first partition 208 on TS-48 206 of the source storage cluster 202.

Figure 4:
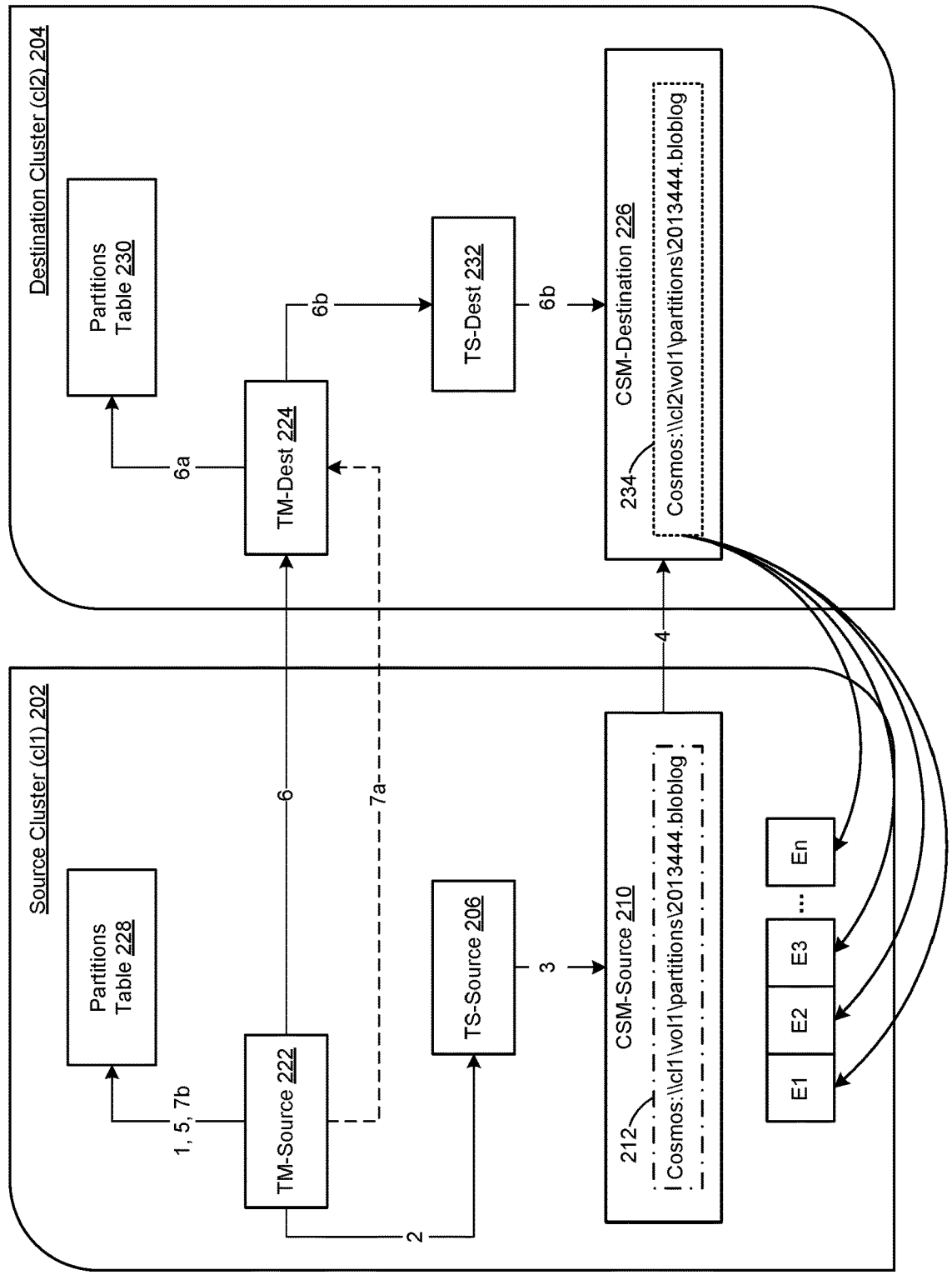
FIG. 4 schematically shows aspects of a handoff phase of the partition handoff.

The TM-Source may begin the handoff phase once the preparation phase 300 is complete. FIG. 4 illustrates aspects of an example handoff phase 400 in which the extents are handed off to the CSM-Dest 226. In some instances, user traffic to the storage account being migrated is regulated during the handoff phase 400.

As indicated by arrow (1), the TM-Source 222 updates the partition flag in the source partitions table 228 for the partition being handed-off by removing a flag indicating a beginning of preparation for partition handoff on the source and setting a flag indicating a beginning of the partition handoff on the source. Updating the flags may help with TM failover cases so that the TM-Source 222, when reconstructing its in-memory state from the source partitions table 228, knows at which step to resume the hand-off operation.

As indicated by arrow (2), the TM-Source 222 issues a command to the TS-Source 206 to perform partition handoff from the TS-Source, which may be an asynchronous API request in some examples. In response, the TS-Source 206 performs a sequence of processes, as indicated by arrow (3).

At arrow (3), the TS-Source 206 persists the partition handoff state information, such as the partition flags with hand-off state information and the source cluster name, in its metadata stream record. In instances that the partition reloads for any reason (e.g. the TS-Source crashes or restarts, emergency offload, forceful partition reassignment, etc.), the TS-Source 206 may re-execute the steps involved in the partition handoff from the TS-Source API during reload using the metadata stream record. For example, the TS-Source may re-execute by submitting a job to a lazy worker. When the partition is reloaded on the source storage cluster 202, e.g. in instances that the TS-Source 206 crashes or restarts during handoff, the new TS-Source loading the partition may detect the case and resume partition handoff. When an extent handoff is successful and the partition loads on the destination storage cluster, the record is read by the destination storage cluster 204, which knows that the partition is in a handoff state from the source storage cluster 202.

The TS-Source 206 also blocks new requests in the same or a separate write to the metadata stream as the partition handoff state information. This causes the FE to back off and retry. As the actual handoff phase may potentially fail, the FEs direct to the same table server until the handoff phase is successful. This also may help to simplify rollback. Further, the TS-Source 206 sends a command via an API to the CSM-Source 210 to complete the handing off of extents belonging to one or more streams of the first partition 208 on the source storage cluster 202 to the destination storage cluster 204.

The CSM-Source 210 interacts with the CSM-Dest 226 to complete the extent handoff process, as indicated by arrow (4). The CSM-Source 210 226 seals unsealed extents on the source storage cluster 202 and complete the handoff of extents belonging to each stream of the first partition 208. Completing the handoff of the extents of each stream may involve, for example, transferring metadata for stale extents metadata and the new extents to the CSM-Dest 226, and the CSM-Dest 226 assuming ownership of the extents. The CSM-Source 210 further may change an access attribute of the extents to read-only, thereby invalidating the extents at the source storage cluster. The CSM-Source 210 also may perform a scrub and/or a validation of the extents handed off, to ensure that the extents are intact on the destination storage cluster 204. More specifically, the CSM-Source 210 ensures that none of the extents of the source storage cluster stream 212 are missing in the corresponding stream 234 on the destination storage cluster 202. If either of these steps fail or a deadline passes, the TS-Source 206 may return a failure error code to the TM-Source 222 and resume serving user requests. In this example, the TM-Source 222 is responsible for re-trying or proceeding with aborting the handoff phase. Further, the CSM-Source 210 performs a release partition command to invalidate a partition entry in the partition map in-memory.

As indicated by arrow (5), the TM-Source 222 updates its own partitions table 228 by adding a redirection for the key range to point to the destination storage cluster 204 and updating the partition flag to indicate that partition handoff from the source is completed. The updated partition flag indicates that work by the source storage cluster 202 is complete and the handoff phase is pending on the destination storage cluster 204. This way, the TM-Source 222 knows where to resume the handoff phase if the TM-Source 222 fails over. The redirection entry in the source partitions table 228 may comprise a string containing a cluster name in place of the table server serving the key range. FEs maintain partition maps for the source and destination storage clusters, so the redirection entry in the source partitions table 228 to the destination partitions table 230 may be an in-memory lookup during TS name resolution. Whenever a partition map entry is invalidated, the FE fetches all partitions information, resolves all TS endpoints (table servers serving the respective key ranges), and maintains the resolved endpoint object associated with each partition entry, so that the FE may readily serve requests. The redirection entry does not add overhead to user requests, as the redirection entry is used for name resolution performed outside of the user request path.

As indicated by arrow (6), the TM-Source 222 informs the TM-Dest 224 to assume ownership of the key range, for example, via an asynchronous API call. At (6a), the TM-Dest 224 selects a TS-Dest 232 to load the partition and updates the TS-Dest details in the destination partitions table 230 for the handed-off partition, which may be similar to an ordinary (e.g. not during a handoff) partitions table update in some examples. The TM-Dest 224 clears the flag indicating that the partition handoff to the destination storage cluster is in progress, after which the partition key range is owned by the TM-Dest 224.

At (6b), the TM-Dest 224 instructs the TS-Dest 232 to load the partition. The TS-Dest 232 loads the partition, and upon successful load of the partition on the TS-Dest 232, the TS-Dest 232 may delete the metadata record containing the partition handoff state (e.g. the record indicating that the partition handoff is in progress) entered on the source storage cluster 202. Once the partition is loaded on the destination storage cluster 204, live traffic is reopened and the partition state record for live traffic is updated. If the TM-Dest 224 fails over in step (6a), the TM-Source 222 may continue retrying until the TM-Source 222 receives an acknowledgement. If the TM-Dest 224 crashes or restarts in step (6b), a subsequent load attempt may reliably detect that this is the first load after handoff using the metadata stream record (e.g., using a record indicating that the partition handoff is in progress).

As indicated by arrow (7a), the TM-Source 222 polls/retries for completion of ownership transfer to the TM-Dest 224. More specifically, the TM-Dest 224 updates the destination partitions table 230 after clearing the partition flag indicating that the partition handoff to the destination storage cluster is in progress. Once the TM-Source 222 receives an acknowledgment from the TM-Dest 224, the TM-Source 222 updates the partition flag in its partitions table 228 to indicate that the partition handoff is complete, which signifies the transfer of ownership of the partition key range to the destination storage cluster 204, as indicated by arrow (7b). The redirection entry may help re-direct FE requests to this key range to the destination storage cluster 204.

After redirection, the CSM-Dest 226 may migrate extents from the source storage cluster 202 to the destination storage cluster 204 (or any other storage cluster in a destination limitless pool) without any urgency. In some examples, an affinity policy may be set to not move data on all streams by default, and to move data at capacity threshold on certain streams. Such affinity policies may be retrofitted, or new policies introduced, such that extents of certain streams are given higher preference over others for data transfer.

Once all extents of a partition are migrated to the destination storage cluster 204, the TM-Source 222 may delete partition streams from the source storage cluster 202 using a CSM-Source API on an account migration engine. Clearing streams on the source storage cluster 202 helps to free up capacity on the source storage cluster 202. In some examples, the TM-Source 222 may wait until a full storage account including all partitions of the storage account is transferred to the destination storage cluster 204 to delete the partition streams. A migration tool polls the status of migration on each of the streams on the source storage cluster, and once all extents belonging to a stream are migrated and verified, the migration tool may proceed with cleanup. The streams and partitions entries for the transferred partitions may be cleaned up around the same time. Otherwise, partition maintenance may clean up the streams if there are no partition entries based on an assumption that the streams are orphaned streams.

As mentioned above, one or more partition flags and/or the partition metadata stream record for the partition handoff may be updated during the handoff phase 400. At the end of an example preparation phase 300, the source partitions table 228 may include a flag indicating a state of beginning to prepare for the partition handoff on the source storage cluster 202, the destination partitions table 230 may include a flag indicating the partition handoff is in progress on the destination storage cluster 204, and the metadata stream record for the partition handoff may include a record indicating preparation for the partition handoff on the source storage cluster is in progress. In one specific example, the following partition flag and partition metadata stream record updates occur during the handoff phase 400. At processes indicted by arrows (1) and (2) in FIG. 4, the TM-Source 222 may update the partition flag in the source partitions table 228 to indicate a state of beginning the partition handoff on the source storage cluster 202. At processes indicated by arrows (3) and (4) in FIG. 4, the TS-Source 206 may update the partition metadata stream record after blocking live traffic to the source storage cluster 202, e.g. to a record indicating that the partition handoff is in progress. At the process indicated by arrow (5) in FIG. 4, after extent handoff, the TM-Source 222 may update the flag in the source partitions table 228 to indicate completion of partition handoff on the source storage cluster 202. At the process indicated by arrow (6a) in FIG. 4, the TM-Dest 224 may update the destination partitions table 230 after assuming ownership of the key range, e.g. to clear the flags related to partition handoff in the destination partitions table 230. At the process indicated by arrow (6b) in FIG. 4, the TS-Dest 232, upon successful partition load, may clear the partition metadata stream record for the partition handoff. At the process indicated by arrow (7b) in FIG. 4, the TM-Source 222, after receiving an acknowledgement from the TM-Dest 224 regarding key ownership transfer, may update the partition flag in the source partitions table 228 to indicate completion of the partition handoff. After all partitions to be migrated are transferred to the destination storage cluster 204 and LT cleanup is initiated, the TM-Source 222 may clear all corresponding partition entries in the source partitions table 228.

Following the handoff phase 400, the TS-156 of the destination storage cluster 204 serves the first partition belonging to the storage account being migrated from the source storage cluster 202 to the destination storage cluster 204. The streams and underlying extents of the first partition are owned and managed by the CDM-Dest 226. The source partitions table 228 includes a redirection entry for the first partition, which now points to the destination partitions table 230. Further, user requests for the storage account that are directed to FE roles on both the source and destination storage clusters 202, 204 are correctly redirected to the handed-off partition on TS-156 232 of the destination storage cluster 204.

The stream layer may perform, as a background process, data verification for the extents being migrated. The stream layer also may perform failure handling and retry/alerting during the migration of extent data. In some examples, verification of migrated partition objects and the underlying data may be performed by iterating through each object in a partition and reading the objects, data, and optionally the underlying data on the source and destination storage clusters, and comparing using a geo-pipeline-based verification. In contrast, verification for the disclosed handoff process (preparation phase 300 and handoff phase 400) may include extent metadata verification, extent reachability, table layer index validity, extent data integrity/verification, and geo verification.

Extent metadata verification may occur during the handoff phase, for example, by determining that the extents and the order of the extents in the source and the destination streams are the same at the time of handoff. The CSM-Source 210 and the CSM-Dest 226 may perform the extent metadata verification. For example, verification may be performed inline by CSM APIs during metadata migration (preparation and finalization steps). If an extent is missing or not in the correct order, a finalize call fails and the partition begins serving user traffic on the source storage cluster 202.

After a partition is handed off to the destination storage cluster 204, the distributed computing system determines whether all extents are reachable and readable from the destination storage cluster 204. When the partition is handed off from the source storage cluster 202 and loads on the destination storage cluster 204, the destination storage cluster 204 may initiate a work item to determine extent reachability. For every stream in the partition, a scrubber may fetch all the extents in each stream and try to read at least one byte per extent. The scrubber also may perform extent length checks to ensure that the extent is reachable and known to the CSM-Dest 226. An alert is raised if an extent is unreachable. In one specific example, determining extent reachability for a data stream comprising approximately 200,000 extents may complete within an hour after handing off the partition to the destination storage cluster 204.

Table layer index validity scrubbing may help to determine whether file tables include dangling pointers to the extents (the extents portion of the partition index that are not part of the destination streams). For example, a scrubber within the partition may be used to ensure that extents are reachable on the destination storage cluster 204 stream and that ordering is the same as ordering of the source storage cluster 202 stream. Further, the TM-Source may ask a garbage collection (GC) master to schedule a high priority GC run with zero rewrite for the partitions handed off to the destination source cluster(s). In this manner, the GC run may find any dangling pointers in the index or issues with extents reachability. Since these are high priority GC runs with no data rewrites, they may be expected to complete before normal long-term (LT) cleanup (e.g. within seven days after data migration completion). During LT cleanup, blank partitions on the source storage cluster 202 are allowed to accept new traffic and migrated streams on the source storage cluster 202 are deleted from the source storage cluster 202 via the CSM-Source API. Before LT cleanup, a driver may check the last GC runtime completed or not completed, and fail LT cleanup if any GC runs are pending. A force LT cleanup may also be used to skip this check, in some examples.

Extent data integrity/verification may be performed after a partition is handed off to the destination storage cluster 204, user traffic is routed to the destination storage cluster 204 for the corresponding key range, and the extent data is copied to the destination storage cluster 204. Once this verification succeeds, the extents on the source storage cluster 202 may be deleted. Because all extents are sealed before and during the partition handoff, the extent data is immutable and can be compared on the source and destination storage clusters. The data verification for the extents being migrated thus may be performed as a background process separate from the user request path.

Since partitions may be handed off within the same data center, across zonal data centers within the same region, and/or across geographically separated regions, the geo verification scans the partition index and validates the integrity of data stored using cyclic redundancy checks (CRCs).

As mentioned above, a partition handoff may fail, or an account migration may be unintentionally aborted during the preparation phase and/or the handoff phase. Further, one or more of the TM-Source 222, TM-Dest 224, TS-Source 206, and TS-Dest 232 may restart or fail. In such instances, a TM master log may help to restart/resume operations.

When failure occurs during the preparation phase 300 during or after the TM-Dest 224 completes creation of streams on the destination storage cluster 204, the TM-Source may issue an abort command to the TM-Dest 224. The abort command may delete the streams and remove the entry in the destination partitions table 230. If the TM-Dest 224 command fails with non-retriable error, the TM-Source 222 may issue the same abort command to trigger cleanup. In another example, failure may occur during or after the preparation for partition handoff from the TS-Source, where the TS-Source 206 interacts with the CSM-Source 210 to prepare extent metadata handoff. The TM-Source 206 may issue an abort command or cleanup command (e.g. to reset partition handoff) to abort the cancel of the CSM-Source operation or cleanup if the extent metadata preparation is already complete. In such instances, the TM-Source 222 may also perform an API call to abort or cleanup the preparation for partition handoff on the TM-Dest 224.

Failure may also occur during the handoff phase. In examples where failure occurs during or after the partition handoff from the TS-Source call, the TM-Source 222 may issue a command to abort the handoff from the TS-Source, cleanup on the destination storage cluster 204, and resume accepting user requests. The TM-Source 222 also may issue a command to abort preparation for partition handoff from the TS-Source, to clean up the streams on the destination storage cluster 204. In other examples, failure or abort handling may include any suitable combination of the disclosed rollback scenarios. Further, rollback after a partition handoff is complete may follow a partition handoff process for handing off the partition from the destination storage cluster to the source storage cluster.

As mentioned above, a partition transfer from a source storage cluster to a destination storage cluster may be performed as part of an account migration process. An account scheduler determines whether to migrate a storage account and to which destination clusters based on any number of criteria. Once a storage account and its destination storage cluster(s) are selected, and any preparatory steps for the partition handoff process are satisfied (e.g. pairing source and destination clusters), a location service (e.g. a global and/or a regional location service) begins the migration of the storage account for example, by interacting with a driver (e.g. an account migration engine) of the source and destination storage clusters.

To prepare for account migration, the migration scheduler evaluates a health of the streams and extents of all partitions belonging to the storage account. For example, the migration scheduler may determine that an encryption key used to encrypt the partition index is the same on the source and destination storage clusters. The migration scheduler also may determine a total number of extents per stream, a maximum extent reference count, etc., such that the extent handoff may complete within a targeted amount of time. In some examples, each partition handoff may complete within two minutes. In a more specific example, each partition handoff may complete within a few seconds.

Executing the account migration involves, for example, quarantining the account key range in all tables and replicating an account row. To quarantine the account key range, a driver (e.g. an account migration engine) of the destination storage cluster 204 creates the account row and copies all XLS owned properties from the source storage cluster 202. Any future updates to the account row, such as those resulting from user control plane operations, will be explicitly added to the appropriate partitions and streams by XLS.

A driver (e.g. an account migration engine) of the source storage cluster 202 sends an account migration command, including an account name and the destination storage cluster, to the TM-Source 222. The TM-Source initiates the partition handoff process for one or more partitions concurrently, where each partition is quarantines and a load balancer (LB) is blocked while the partition handoff is in progress. In some examples, the partition handoff may complete within minutes. A TM of a secondary source storage cluster may also receive the same command as TM-Source 222 and perform the same migration processes as the primary source storage cluster.

Once all partitions are handed off to the destination storage cluster 204, service metadata for the storage account (in the account row) on the source storage cluster 202 is updated with redirection information for the storage account, which points to the destination storage cluster 204. The redirection entry in the accounts table may comprise the destination storage cluster name, as both the source and destination storage clusters load the accounts table of both clusters. The in-memory redirection is conceptually similar to the partition table redirection entry described above.

As long as both the source and destination storage clusters are paired, user requests landing on the source storage cluster 202 will be correctly resolved to the destination partitions table 230. Once the storage account is un-virtualized and cluster pairing is removed (e.g., as part of a post-migration finalization, described in more detail below), user requests landing on the source storage cluster 202 (e.g. due to stale DNS) are dispatched to the destination storage cluster 204 using the redirection entry.

Once the account table of the source storage cluster 202 includes the redirection entry to the destination storage cluster 204, the partitions table redirection entries on the source storage cluster 202 are no longer needed. Thus, after an account is handed off to the destination storage cluster 204, the distributing computing system may purge the redirection entries in the source partitions table 228 for all handed off partitions. User requests landing on the FE of the source storage cluster 202 may cause the FE to lookup account tables of each storage cluster to determine the home storage cluster for the storage account, and lookup the partitions table of the home storage cluster to determine which TS serves the key range.

The migration scheduler may monitor the progress of extents being migrated by the stream layer to the destination cluster (e.g. using an API) before proceeding to post-migration finalization. Once all the partitions of the storage account are handed off to the destination storage cluster and migration of the extents to the destination storage cluster is verified, the migration scheduler may un-virtualize the storage account being migrated such that DNS records for the storage account point to the destination storage cluster 204. In this manner, the destination storage cluster 204 may receive customer requests, including when a customer request involves data not yet migrated from the source storage cluster 202 to the destination storage cluster 204. The migration scheduler also purges the accounts row in the account table of the source storage cluster 202 and cleans up the partitions streams on the source storage cluster 202. Optionally, the migration scheduler unpairs the source and destination storage clusters through a cluster resource manager (CRM) once all storage accounts (including underlying data) have been migrated from the source storage cluster 202 to the destination storage cluster 204, e.g. to decommission the source storage cluster 202.

As mentioned above, account migration involves pairing both source and destination storage clusters through a CRM. If the storage clusters support migration across geographical regions, then the respective secondary storage clusters may be paired together by XLS sending an account migration command to the TM on source primary storage cluster and source secondary storage cluster. No coordination may be required between primary and secondary storage clusters, for both source and destination storage cluster.

Figure 5:
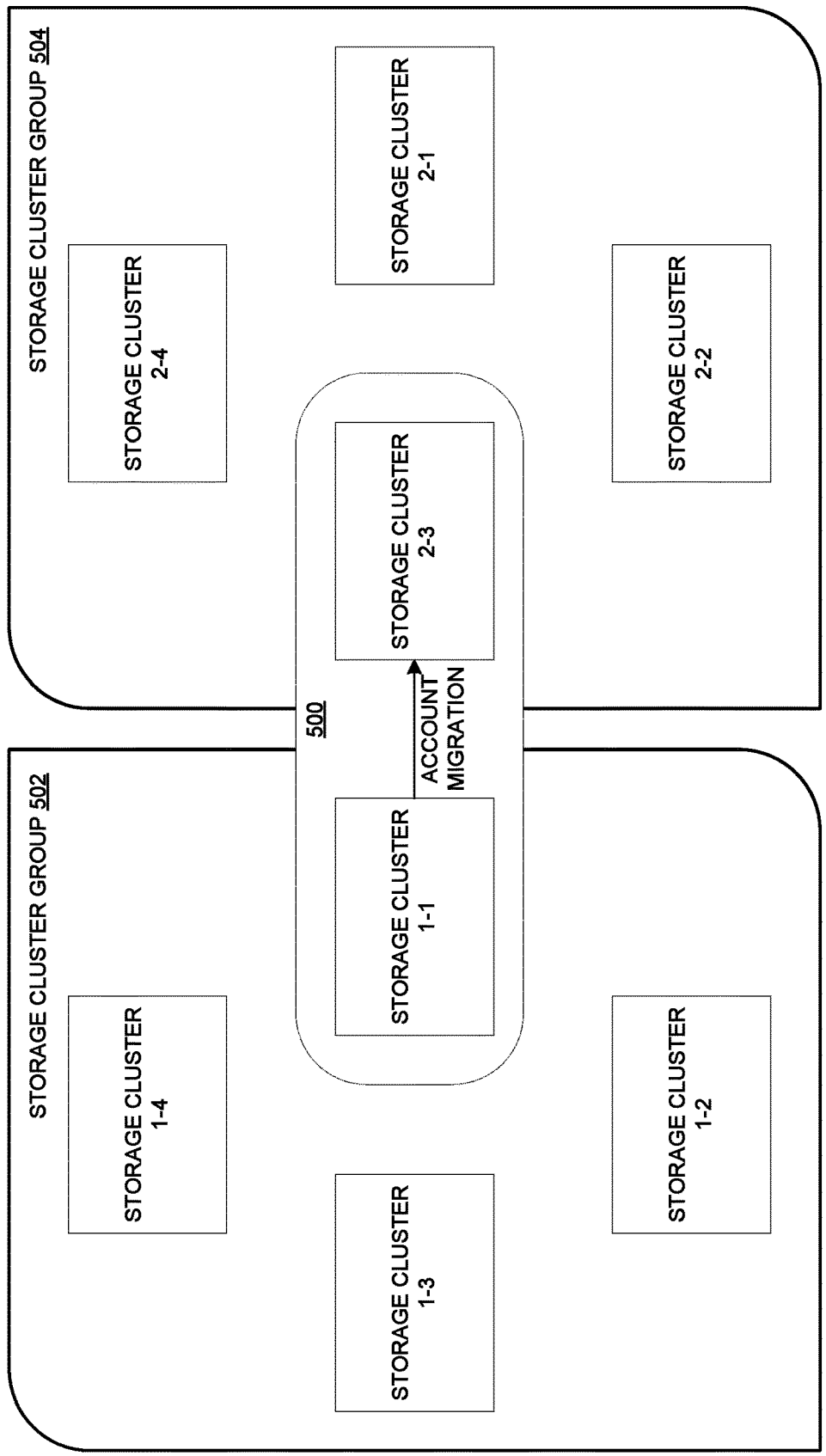
FIG. 5 schematically shows aspects of resource balancing among storage cluster groups.

The examples disclosed herein are not limited to alleviating capacity, TPS, and CPU resources at an individual storage cluster level. In some examples, the disclosed methods may be used to balance CPU, TPS, and/or capacity resources across a group of storage clusters. FIG. 5 depicts an example pairing 500 of two storage cluster groups for account migration across the storage cluster groups. In this example, a first cluster group 502 has reached a threshold resource limit (e.g. CPU usage, TPS, and/or capacity), and pairing the first storage cluster group 502 with a second storage cluster group 504 may not be an option due to scale and/or performance reasons. To alleviate a burden on the first storage cluster group 502, accounts from storage cluster 1-1 of the first storage cluster group 502 may be migrated to storage cluster 2-3 of the second storage cluster group 504.

Figure 6:
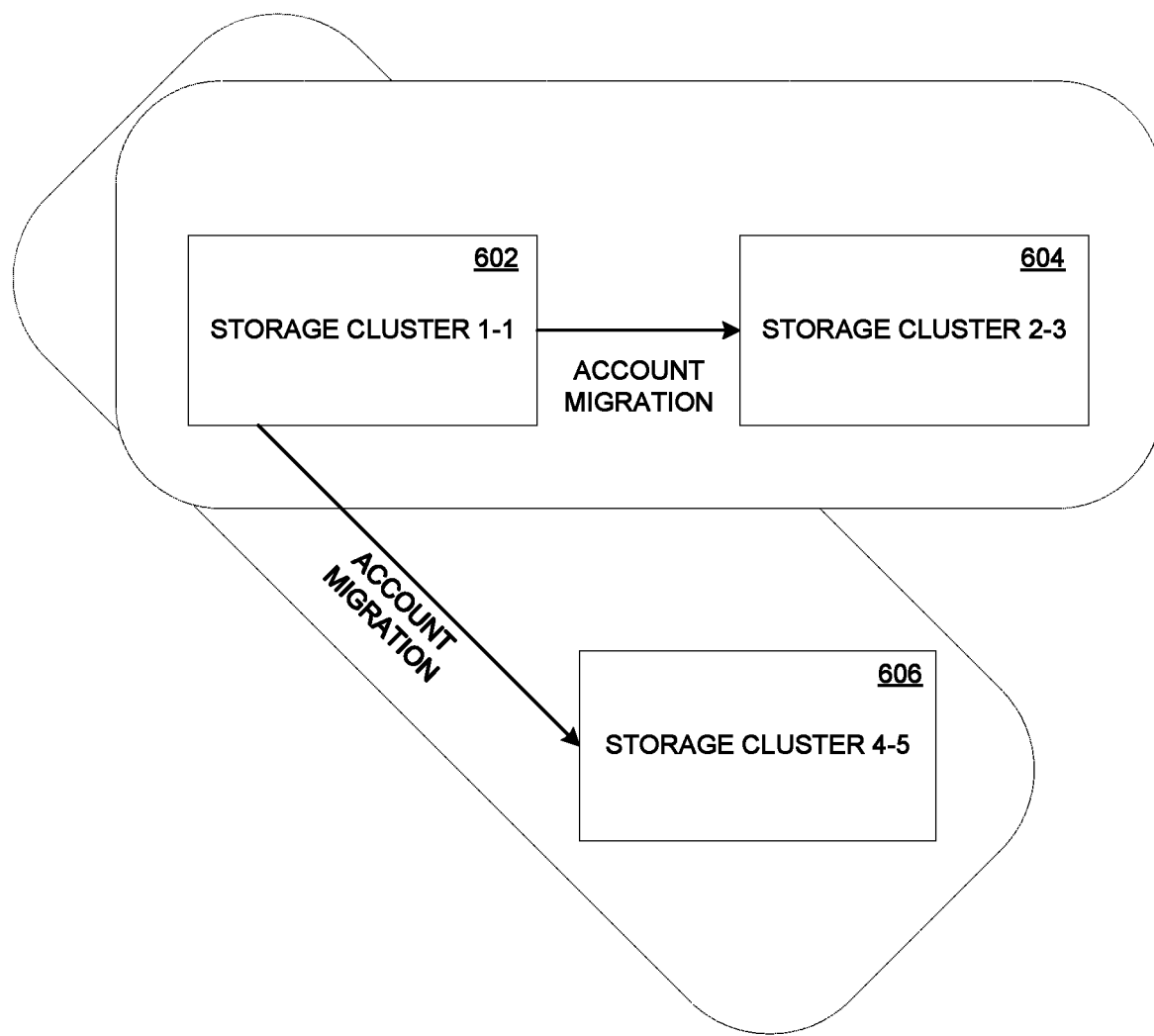
FIG. 6 schematically shows aspects of parallel migrations to multiple destination storage clusters.

The disclosed examples also support storage account migrations to multiple destination clusters, as shown in FIG. 6. In this example, a source storage cluster 602 performs account migration to destination storage clusters 604 and 606 in parallel. This may help to speed up decommissioning of older hardware storage clusters by migrating storage accounts to multiple destination storage clusters in parallel.

Figure 7:
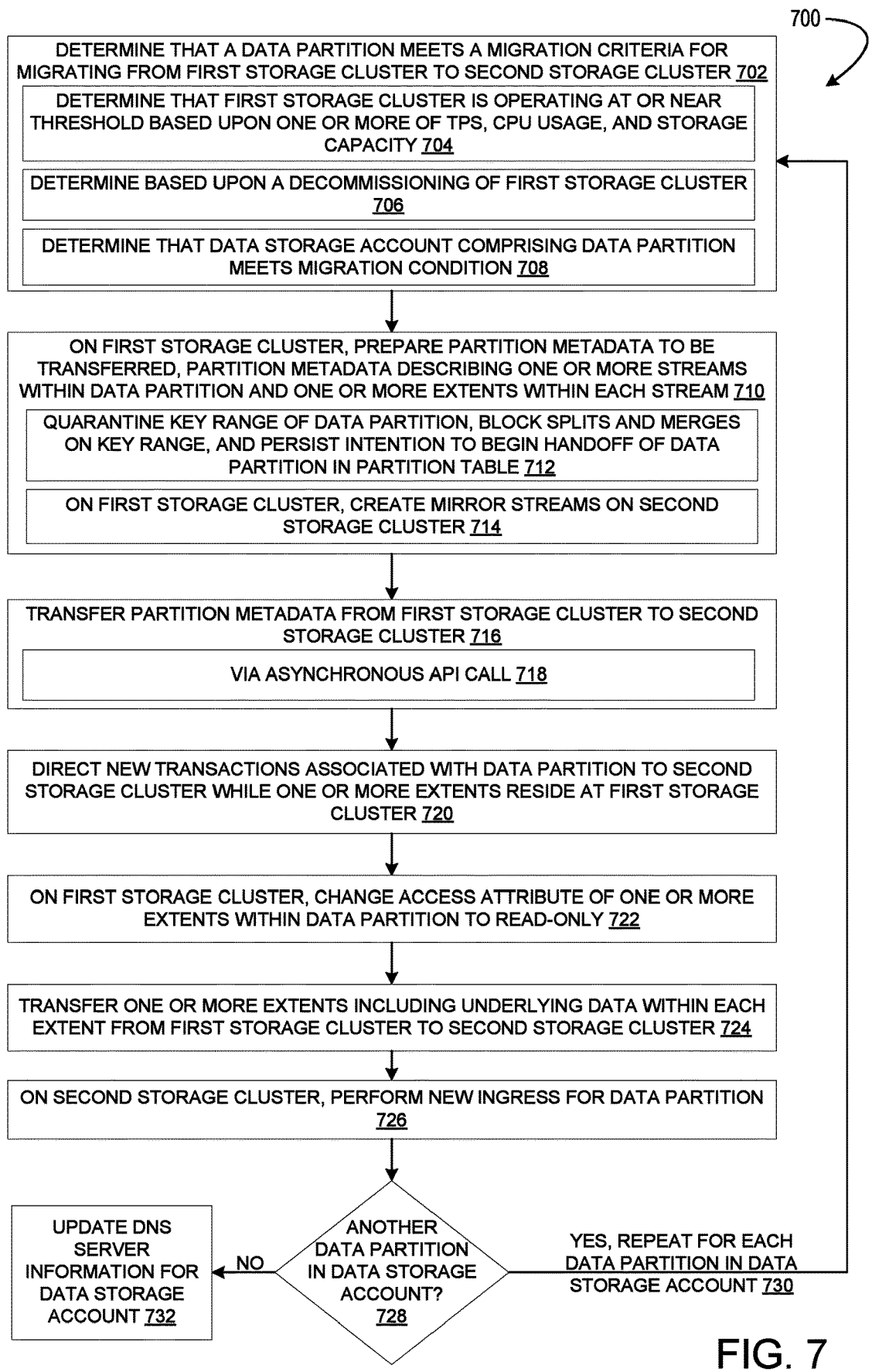
FIG. 7 shows a flowchart illustrating an example method of migrating a data partition from a first storage cluster to a second storage cluster.

FIG. 7 illustrates an example method 700 for transferring a data partition belonging to an account being migrated from a first storage cluster (source) to a second storage cluster (destination). Method 700 may be implemented as stored instructions executable by a computing system, such as distributing computing system 102.

At 702, method 700 comprises determining that a data partition meets a migration criteria for migrating from the first storage cluster to the second storage cluster. Determining that the data partition meets the migration criteria may comprise determining that the first storage cluster is operating at or near a threshold based upon one or more of TPS, CPU usage, and storage capacity, as indicated at 704. Determining that the data partition meets the migration criteria further may comprise determining based upon a decommissioning of the first storage cluster, as indicated at 706. Determining that the data partition meets the migration criteria also may comprise determining that a data storage account comprising the data partition meets the migration condition, as indicated at 708.

At 710, method 700 comprises, on the first storage cluster, preparing partition metadata to be transferred. The partition metadata describes one or more streams within the data partition and one or more extents within each stream. Preparing the partition metadata may comprise quarantining a key range of the data partition, blocking splits and merges on the key range, and persisting an intention to begin handoff of the data partition in a partition table, as indicated at 712. Preparing the partition metadata may also comprise, on the first storage cluster, creating mirror streams on the second storage cluster, as indicated at 714.

At 716, method 700 comprises transferring the partition metadata from the first storage cluster to the second storage cluster. In some examples, transferring the partition metadata may be performed via an asynchronous API call, as indicated at 718.

At 720, method 700 comprises directing new transactions associated with the data partition to the second storage cluster, including while one or more extents reside at the first storage cluster. At 722, method 700 comprises, on the first storage cluster, changing an access attribute of the one or more extents within the data partition to read-only. At 724, method 700 comprises transferring the one or more extents, including underlying data within each extent, from the first storage cluster to the second storage cluster. At 726, method 700 comprises, on the second storage cluster, performing new ingress for the data partition.

At 728, method 700 comprises determining whether the data storage account being migrated includes another data partition to transfer. If there are additional data partitions within the data storage account being migrated, then method 700 comprises, at 730, repeating method steps 702-726 for each data partition of the data storage account. It will be understood that multiple data partitions of the data storage account may be transferred concurrently, in various examples. When the data storage account being migrated includes no additional data partitions to transfer, then method 700 comprises, at 732, updating DNS server information for the data storage account (e.g. to direct user traffic to the second storage cluster).

The partition handoff performed in method 700 operates at a partition boundary such that, once the source storage cluster hands off a partition to the destination storage cluster, new requests for that partition boundary directly land on the partition on destination storage cluster without needing to wait for migration of all partitions of a storage account to complete. Unlike migration operations that involve deep copying of all objects, the examples disclosed herein allow traffic to be switched to the destination storage cluster without the user transactions being fully caught up to a recovery point objective (RPO).

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
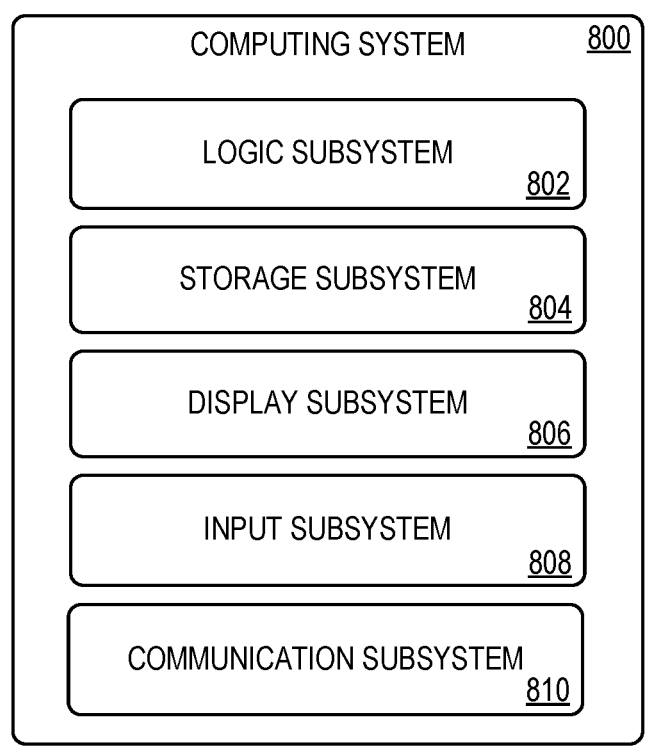
FIG. 8 shows a block diagram illustrating an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" may be used to describe an aspect of computing system 800 implemented to perform a particular function. In some cases, a program may be instantiated via logic machine 802 executing instructions held by storage machine 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides, enacted on a computing system, a method of migrating a data partition from a first storage cluster to a second storage cluster, each storage cluster being implemented via one or more server computers, the method comprising determining that the data partition meets a migration criteria for migrating from the first storage cluster to the second storage cluster, on the first storage cluster, preparing partition metadata to be transferred, the partition metadata describing one or more streams within the data partition and one or more extents within each stream, transferring the partition metadata from the first storage cluster to the second storage cluster, directing new transactions associated with the data partition to the second storage cluster, including while the one or more extents reside at the first storage cluster; on the first storage cluster, changing an access attribute of the one or more extents within the data partition to read-only, and on the second storage cluster, performing new ingress for the data partition. In such an example, the method may additionally or alternatively comprise, after changing the access attribute of the one or more extents within the data partition to read-only, transferring the one or more extents including underlying data within each extent from the first storage cluster to the second storage cluster. In such an example, determining that the data partition meets the migration criteria may additionally or alternatively comprise determining that the first storage cluster is operating at or near a threshold based upon one or more of transactions per second (TPS), CPU usage, and storage capacity. In such an example, determining that the data partition meets the migration criteria may additionally or alternatively be based upon a decommissioning of the first storage cluster. In such an example, preparing the partition metadata to be transferred may additionally or alternatively comprise quarantining a key range of the data partition, blocking splits and merges on the key range, and persisting an intention to begin a handoff of the data partition in a partition table. In such an example, preparing the partition metadata to be transferred may additionally or alternatively comprise, on the first storage cluster, creating mirror streams on the second storage cluster. In such an example, transferring the partition metadata from the first storage cluster to the second storage cluster may additionally or alternatively be performed via an asynchronous API call. In such an example, determining that the data partition meets the migration criteria for migrating from the first storage cluster to the second storage cluster may additionally or alternatively comprise determining that a data storage account comprising the data partition meets the migration criteria for migrating from the first storage cluster to the second storage cluster. In such an example, the method may additionally or alternatively comprise updating domain name system (DNS) server information for the data storage account. In such an example, the data partition may additionally or alternatively be a first data partition of a plurality of data partitions determined to meet the migration criteria, and the method may additionally or alternatively comprise, on the first storage cluster, preparing second partition metadata to be transferred, the second partition metadata describing one or more streams within a second data partition and one or more extents within each stream of the second data partition, transferring the second partition metadata from the first storage cluster to the second storage cluster, directing new transactions associated with the second data partition to the second storage cluster, including while the one or more extents within the second data partition reside at the first storage cluster, on the first storage cluster, changing an access attribute of the one or more extents within the second data partition to the read-only, and on the second storage cluster, performing new ingress for the second data partition.

Another example provides a computing system, comprising a first storage cluster and a second storage cluster, each storage cluster being implemented via one or more server computers, and memory holding instructions executable by the logic subsystem to determine that a data partition of the first storage cluster meets a migration criteria for migrating the data partition from the first storage cluster to the second storage cluster, on the first storage cluster, prepare partition metadata describing one or more streams within the data partition and one or more extents within each stream, transfer the partition metadata from the first storage cluster to the second storage cluster, direct new transactions associated with the data partition to the second storage cluster, including while the one or more extents remain on the first storage cluster, on the first storage cluster, change an access attribute of the one or more extents within the data partition to read-only, and on the second storage cluster, perform new ingress for the data partition. In such an example, the instructions may additionally or alternatively be executable to, after changing the access attribute of the one or more extents within the data partition to read-only, transfer the one or more extents including underlying data within each extent from the first storage cluster to the second storage cluster. In such an example, the instructions may additionally or alternatively be executable to determine that the data partition meets the migration criteria by determining that the first storage cluster is operating at or near a threshold based upon one or more of transactions per second (TPS), CPU usage, and storage capacity. In such an example, the instructions may additionally or alternatively be executable to determine that the data partition meets the migration criteria based upon a decommissioning of the first storage cluster. In such an example, the instructions executable to prepare the partition metadata to be transferred may additionally or alternatively be executable to quarantine a key range of the data partition, block splits and merges on the key range, and persist an intention to begin a handoff of the data partition in a partition table. In such an example, the instructions executable to prepare the partition metadata to be transferred may additionally or alternatively be executable to, on the first storage cluster, create mirror streams on the second storage cluster. In such an example, the instructions may additionally or alternatively be executable to transfer the partition metadata from the first storage cluster to the second storage cluster via an asynchronous API call. In such an example, the instructions may additionally or alternatively be executable to determine that the data partition meets the migration criteria for migrating from the first storage cluster to the second storage cluster by determining that a data storage account comprising the data partition meets the migration criteria for migrating from the first storage cluster to the second storage cluster. In such an example, the data partition may additionally or alternatively be a first data partition of a plurality of data partitions determined to meet the migration criteria, and the instructions may additionally or alternatively be executable to, on the first storage cluster, prepare second partition metadata to be transferred, the second partition metadata describing one or more streams within a second data partition and one or more extents within each stream of the second data partition, transfer the second partition metadata from the first storage cluster to the second storage cluster, direct new transactions associated with the second data partition to the second storage cluster, including while the one or more extents within the second data partition reside at the first storage cluster, on the first storage cluster, change an access attribute of the one or more extents within the second data partition to the read-only, and on the second storage cluster, perform new ingress for the second data partition.

Another example provides, enacted on a computing system, a method of migrating a data storage account from a first storage cluster to a second storage cluster, the method comprising, for each key range of a plurality of key ranges within the data storage account, transferring metadata for the key range from the first storage cluster to the second storage cluster, once metadata for all key ranges within the data storage account has been transferred from the first storage cluster to the second storage cluster, updating domain name system (DNS) server information for the data storage account, and receiving customer requests at the second storage cluster, including when a customer request involves data not yet migrated from the first storage cluster to the second storage cluster.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a computing system, a method of migrating a data partition from a first storage cluster to a second storage cluster, each storage cluster being implemented via one or more server computers, the method comprising:
   determining that the data partition meets a migration criterion for migrating from the first storage cluster to the second storage cluster;
   on the first storage cluster, preparing partition metadata to be transferred, the partition metadata describing one or more streams within the data partition and one or more extents within each stream;
   transferring the partition metadata from the first storage cluster to the second storage cluster;
   directing new transactions associated with the data partition to the second storage cluster, including while the one or more extents reside at the first storage cluster;
   on the first storage cluster, changing an access attribute of the one or more extents within the data partition to read-only; and
   on the second storage cluster, performing new ingress for the data partition.

2. The method of claim 1, further comprising, after changing the access attribute of the one or more extents within the data partition to read-only, transferring the one or more extents including underlying data within each extent from the first storage cluster to the second storage cluster.

3. The method of claim 1, wherein determining that the data partition meets the migration criteria comprises determining that the first storage cluster is operating at or near a threshold based upon one or more of transactions per second (TPS), Central Processing Unit (CPU) usage, and storage capacity.

4. The method of claim 1, wherein determining that the data partition meets the migration criteria is based upon a decommissioning of the first storage cluster.

5. The method of claim 1, wherein preparing the partition metadata to be transferred comprises:
   quarantining a key range of the data partition;
   blocking splits and merges on the key range; and
   persisting an intention to begin a handoff of the data partition in a partition table.

6. The method of claim 1, wherein preparing the partition metadata to be transferred comprises, on the first storage cluster, creating mirror streams on the second storage cluster.

7. The method of claim 1, wherein transferring the partition metadata from the first storage cluster to the second storage cluster is performed via an asynchronous Application Programming Interface (API) call.

8. The method of claim 1, wherein determining that the data partition meets the migration criteria for migrating from the first storage cluster to the second storage cluster comprises determining that a data storage account comprising the data partition meets the migration criteria for migrating from the first storage cluster to the second storage cluster.

9. The method of claim 8, further comprising updating domain name system (DNS) server information for the data storage account.

10. The method of claim 1, wherein the data partition is a first data partition of a plurality of data partitions determined to meet the migration criteria, the method further comprising:
   on the first storage cluster, preparing second partition metadata to be transferred, the second partition metadata describing one or more streams within a second data partition and one or more extents within each stream of the second data partition;
   transferring the second partition metadata from the first storage cluster to the second storage cluster;
   directing new transactions associated with the second data partition to the second storage cluster, including while the one or more extents within the second data partition reside at the first storage cluster;
   on the first storage cluster, changing an access attribute of the one or more extents within the second data partition to the read-only; and
   on the second storage cluster, performing new ingress for the second data partition.

11. A computing system, comprising:
   a first storage cluster and a second storage cluster, each storage cluster being implemented via one or more server computers; and
   memory holding instructions executable by a logic subsystem to:
      determine that a data partition of the first storage cluster meets a migration criteria for migrating the data partition from the first storage cluster to the second storage cluster;
      on the first storage cluster, prepare partition metadata describing one or more streams within the data partition and one or more extents within each stream;
      transfer the partition metadata from the first storage cluster to the second storage cluster;
      direct new transactions associated with the data partition to the second storage cluster, including while the one or more extents remain on the first storage cluster;
      on the first storage cluster, change an access attribute of the one or more extents within the data partition to read-only; and
      on the second storage cluster, perform new ingress for the data partition.

12. The computing system of claim 11, wherein the instructions are further executable to, after changing the access attribute of the one or more extents within the data partition to read-only, transfer the one or more extents including underlying data within each extent from the first storage cluster to the second storage cluster.

13. The computing system of claim 11, wherein the instructions are executable to determine that the data partition meets the migration criteria by determining that the first storage cluster is operating at or near a threshold based upon one or more of transactions per second (TPS), Central Processing Unit (CPU) usage, and storage capacity.

14. The computing system of claim 11, wherein the instructions are executable to determine that the data partition meets the migration criteria based upon a decommissioning of the first storage cluster.

15. The computing system of claim 11, wherein the instructions executable to prepare the partition metadata to be transferred are executable to:
   quarantine a key range of the data partition;
   block splits and merges on the key range; and
   persist an intention to begin a handoff of the data partition in a partition table.

16. The computing system of claim 11, wherein the instructions executable to prepare the partition metadata to be transferred are executable to, on the first storage cluster, create mirror streams on the second storage cluster.

17. The computing system of claim 11, wherein the instructions are executable to transfer the partition metadata from the first storage cluster to the second storage cluster via an asynchronous Application Programming Interface (API) call.

18. The computing system of claim 11, wherein the instructions are executable to determine that the data partition meets the migration criteria for migrating from the first storage cluster to the second storage cluster by determining that a data storage account comprising the data partition meets the migration criteria for migrating from the first storage cluster to the second storage cluster.

19. The computing system of claim 11, wherein the data partition is a first data partition of a plurality of data partitions determined to meet the migration criteria, and the instructions are further executable to:
   on the first storage cluster, prepare second partition metadata to be transferred, the second partition metadata describing one or more streams within a second data partition and one or more extents within each stream of the second data partition;
   transfer the second partition metadata from the first storage cluster to the second storage cluster;
   direct new transactions associated with the second data partition to the second storage cluster, including while the one or more extents within the second data partition reside at the first storage cluster;
   on the first storage cluster, change an access attribute of the one or more extents within the second data partition to the read-only; and
   on the second storage cluster, perform new ingress for the second data partition.

20. Enacted on a computing system, a method of migrating a data storage account from a first storage cluster to a second storage cluster, the method comprising:
   for each key range of a plurality of key ranges within the data storage account, transferring metadata for the key range from the first storage cluster to the second storage cluster;
   once metadata for all key ranges within the data storage account has been transferred from the first storage cluster to the second storage cluster, updating domain name system (DNS) server information for the data storage account; and
   receiving customer requests at the second storage cluster, including when a customer request involves data not yet migrated from the first storage cluster to the second storage cluster.

* * * * *